Patented Aug. 4, 1931

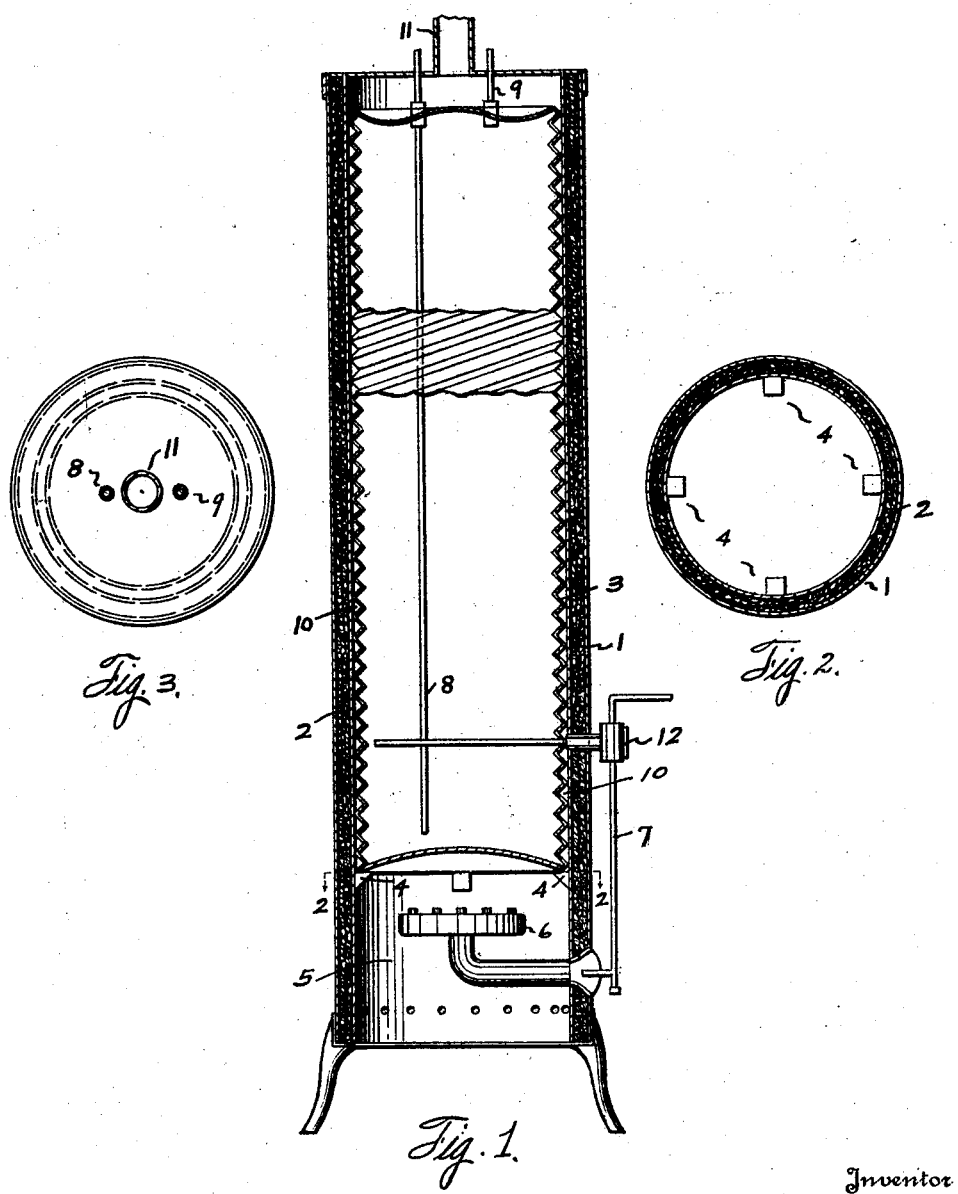

1,817,685

UNITED STATES PATENT OFFICE

WILLIAM A. GRAHAM, OF HOUSTON, TEXAS, ASSIGNOR TO PEOPLES FINANCE & THRIFT CO., OF HOUSTON, TEXAS

WATER HEATING TANK

Application filed March 26, 1929. Serial No. 350,109.

This invention relates to new and useful improvements in a water heating tank.

One object of the invention is to provide a water heating tank of the character described having an outer jacket and an inside container therein to contain the water to be heated, said tank being provided with heat conducting flues between the jacket and inner container through which the hot air and products of combustion may pass from the burner to the outlet flue.

Another object of the invention is to provide a water heating tank having a water container with means for conducting the hot air from the burner about the walls of said container, said walls being formed to provide a maximum heating surface in contact with the heating agent.

With the above and other objects in view this invention has particular relation to certain novel features of construction, operation and arrangement of parts an example of which is given in this specification and illustrated in the accompanying drawings, wherein:—

Figure 1 shows a vertical sectional view of the tank.

Figure 2 shows a cross sectional view thereof taken on the line 2—2 of Figure 1, and Figure 3 shows a top plan view thereof.

Referring now more particularly to the drawings wherein like numerals of reference designate similar parts in each of the figures the numeral 1 refers to an outer jacket preferably formed with double walls and having suitable heat resisting material 2 between said walls.

In the jacket there is a water container 3, of a general cylindrical form and which rests on suitable lugs, or other supports, as 4, carried by the inner wall of the tank. The upper and lower ends of the container 3 are closed and said lower end may be spaced above the lower end of the jacket to provide a burner chamber 5 beneath said container. In the burner chamber there is a conventional burner 6 supplied with fuel through the supply line 7.

Water is supplied to the container 3 through the supply pipe 8 which terminates near the bottom of said container and the hot water is delivered from the container through the service pipe 9.

There is one, or more, flues, or passageways 10 about the container 3 which lead from the chamber 5 and terminate in the upper end of the jacket from which leads the main outlet flue, 11. The flues 10 are preferably spiralled about the container and may be formed by providing spiralled channels or corrugations in said container walls.

The hot air and products of combustion from the burner 6 pass up through the flues 10 about the container 3 and effectively heat the water in said container. If the flues 10 are formed by channeling or corrugating the container walls said walls will thus present a greater heating surface than if smooth and a more efficient heating tank will thus be provided.

The fuel supply line 7 is equipped with the conventional thermostatic governor 12 for the well known purpose.

While I have shown and described what I now consider to be the preferred forms of the invention it is obvious that changes and substitutions may be made within the principle of the invention.

What I claim is:—

In combination, a tank for heating and storing water having a substantially unobstructed central portion adapted to permit of direct vertical movement of water therein, a relatively large number of spiral corrugations formed in the wall of the tank, an outer shell adapted to cooperate with said corrugations to form a relatively large number of separated spiral flues, the major proportion of the walls of which are formed by the walls of the tank, and a burner positioned below said tank whereby the products of combustion will pass upward and through said flues and around said tank to heat the same.

In testimony whereof I have signed my name to this specification.

WILLIAM A. GRAHAM.